US011167180B2

(12) United States Patent
Tattersfield

(10) Patent No.: US 11,167,180 B2
(45) Date of Patent: Nov. 9, 2021

(54) SMART BALL, LOCATOR SYSTEM AND METHOD THEREFOR

(71) Applicant: Jetson I.P. Pty Ltd, Broadbeach (AU)

(72) Inventor: Benjamin Luke Tattersfield, Labrador (AU)

(73) Assignee: Jetson I.P. Pty Ltd, Broadbeach (AU)

( * ) Notice: Subject to any disclaimer, the term of this patent is extended or adjusted under 35 U.S.C. 154(b) by 0 days.

(21) Appl. No.: 16/324,121

(22) PCT Filed: Aug. 11, 2017

(86) PCT No.: PCT/AU2017/050853
§ 371 (c)(1),
(2) Date: Feb. 7, 2019

(87) PCT Pub. No.: WO2018/027280
PCT Pub. Date: Feb. 15, 2018

(65) Prior Publication Data
US 2019/0168081 A1 Jun. 6, 2019

Related U.S. Application Data

(60) Provisional application No. 62/373,390, filed on Aug. 11, 2016.

(51) Int. Cl.
*A63B 43/00* (2006.01)
*A63B 37/02* (2006.01)
(Continued)

(52) U.S. Cl.
CPC .......... *A63B 43/004* (2013.01); *A63B 37/004* (2013.01); *A63B 37/0039* (2013.01);
(Continued)

(58) Field of Classification Search
CPC .............. A63B 37/0051; A63B 37/004; A63B 37/0076; A63B 37/067; A63B 37/0039;
(Continued)

(56) References Cited

U.S. PATENT DOCUMENTS 4,943,055 A * 7/1990 Corley ................... A63B 37/04
473/451
4,955,966 A * 9/1990 Yuki .................. A63B 37/0051
473/359

(Continued)

FOREIGN PATENT DOCUMENTS

CN 107629278 A * 1/2018
CN 109354733 A * 2/2019

OTHER PUBLICATIONS

Doljin, Batdelger et al., Development of a smart cricket ball for advanced performance analysis of bowling, The International Design Technology Conference, DesTech2015, Procedia Technology 20 (2015), pp. 133-137 (Jun. 29, 2015).

(Continued)

*Primary Examiner* — Steven B Wong
(74) *Attorney, Agent, or Firm* — Southern Cross Intellectual Property

(57) ABSTRACT

The present disclosure provides a wireless signal transmitting ball to be used in practice or gameplay of a sport and/or other entertainment activities. The ball of the disclosure comprises a microprocessor unit configured to record, process, and transmit data to a paired device. Further disclosed is a method of actuating the ball between different modes. The ball could be used by players during practice to record data about their performance. The ball could also be used by players or game officials or referees to keep score, adjudicate and decide the gameplay. For example, the information about location of the ball could be used to track balls that could potentially be lost. Additionally, data about spin, trajectory, speed, force applied and the like could be used by players or broadcasters for gaining insights to add to viewing pleasure.

19 Claims, 13 Drawing Sheets

(51) Int. Cl.

| | | |
|---|---|---|
| A63B 37/00 | (2006.01) | |
| A63B 102/18 | (2015.01) | |
| A63B 102/20 | (2015.01) | |
| A63B 71/06 | (2006.01) | |
| G06F 1/16 | (2006.01) | |
| G06F 3/01 | (2006.01) | |
| G06T 19/00 | (2011.01) | |

(52) U.S. Cl.
CPC ...... *A63B 37/0051* (2013.01); *A63B 37/0067* (2013.01); *A63B 37/0076* (2013.01); *A63B 37/02* (2013.01); *A63B 71/0669* (2013.01); *G06F 1/163* (2013.01); *G06F 1/1613* (2013.01); *G06F 3/011* (2013.01); *G06T 19/006* (2013.01); *A63B 2071/0638* (2013.01); *A63B 2071/0666* (2013.01); *A63B 2102/18* (2015.10); *A63B 2102/20* (2015.10); *A63B 2220/12* (2013.01); *A63B 2220/17* (2013.01); *A63B 2220/833* (2013.01); *A63B 2225/20* (2013.01); *A63B 2225/50* (2013.01)

(58) Field of Classification Search
CPC . A63B 37/02; A63B 2102/20; A63B 2102/18; A63B 2220/12; A63B 2220/833; A63B 2225/20; A63B 2225/50
See application file for complete search history.

(56) References Cited

U.S. PATENT DOCUMENTS

| | | | | |
|---|---|---|---|---|
| 5,388,825 A * | 2/1995 | Myers | A63B 43/06 473/570 |
| 5,445,375 A * | 8/1995 | Sweeny | A63B 43/00 273/146 |
| 5,761,096 A * | 6/1998 | Zakutin | A63B 43/00 368/2 |
| 5,864,470 A * | 1/1999 | Shim | H01L 23/3677 174/254 |
| 7,779,686 B1 * | 8/2010 | Rothman | A63B 43/00 473/192 |
| 8,864,609 B2 * | 10/2014 | Kodama | A63B 43/00 473/570 |
| 8,974,266 B2 * | 3/2015 | Liao | G02B 5/0236 446/175 |
| 9,265,991 B2 | 2/2016 | Hohteri | |
| 9,522,306 B1 * | 12/2016 | Ganson | A63B 43/004 |
| 10,159,874 B1 * | 12/2018 | Lin | A63B 43/06 |
| 2003/0153650 A1 * | 8/2003 | Tada | C08L 63/00 523/400 |
| 2003/0211902 A1 * | 11/2003 | Kato | A63B 37/0003 473/371 |
| 2005/0096157 A1 * | 5/2005 | Huang | A63B 37/0003 473/351 |
| 2005/0158535 A1 * | 7/2005 | Zhang | A61L 27/46 428/304.4 |
| 2005/0227792 A1 | 10/2005 | McCreary et al. | |
| 2006/0105857 A1 * | 5/2006 | Stark | A63B 24/0021 473/353 |
| 2006/0173139 A1 * | 8/2006 | Ricci | A63B 37/0003 525/452 |
| 2009/0040761 A1 * | 2/2009 | Huang | A63B 43/06 362/253 |
| 2010/0069181 A1 * | 3/2010 | Lin | A63B 43/06 473/570 |
| 2010/0081517 A1 * | 4/2010 | Sullivan | A63B 37/0003 473/373 |
| 2010/0304895 A1 * | 12/2010 | Comeau | A63B 37/0003 473/376 |
| 2011/0280961 A1 * | 11/2011 | Gaglani | A01N 47/18 424/641 |
| 2012/0214615 A1 * | 8/2012 | Ishii | A63B 37/004 473/376 |
| 2012/0255998 A1 * | 10/2012 | Luciano, Jr. | A63B 43/00 235/439 |
| 2012/0255999 A1 * | 10/2012 | Luciano, Jr. | B29C 43/18 235/439 |
| 2012/0256731 A1 * | 10/2012 | Luciano, Jr. | A63B 43/00 340/10.1 |
| 2012/0301696 A1 * | 11/2012 | Watanabe | C08K 5/3477 428/220 |
| 2013/0165261 A1 * | 6/2013 | Luciano, Jr. | A63B 43/004 473/371 |
| 2013/0196787 A1 * | 8/2013 | Luciano, Jr. | A63B 45/00 473/371 |
| 2014/0052288 A1 * | 2/2014 | El-Siblani | G05B 19/042 700/119 |
| 2014/0277636 A1 * | 9/2014 | Thurman | A63B 71/0605 700/91 |
| 2014/0309063 A1 * | 10/2014 | Molina | G10H 1/26 473/570 |
| 2015/0054632 A1 | 2/2015 | Ben Ezra | |
| 2016/0233795 A1 * | 8/2016 | Savelli | A43B 3/0015 |
| 2017/0050087 A1 * | 2/2017 | Sullivan | A63B 37/0058 |
| 2018/0001149 A1 * | 1/2018 | Luciano, Jr. | B29C 43/027 |
| 2018/0289211 A1 * | 10/2018 | Daniels | A47J 37/0611 |

OTHER PUBLICATIONS

Fuss, Franz et al., Determination of spin rate and axes with an instrumented cricket ball, Procedia Engineering 34 (2012), pp. 128-133 (Feb. 28, 2012).

* cited by examiner

SMART BALL, LOCATOR SYSTEM AND METHOD THEREFOR

FIELD OF THE INVENTION

The present disclosure relates to a smart ball. More particularly, but not exclusively, it relates to a smart ball that is electronically connectable to an electronic system.

SUMMARY

In one aspect, the ball is provisioned to record and transmit data that could be used by game officials or referees to adjudicate and decide the game play.

In another aspect, the ball is provisioned to record and transmit data that could be used by game officials or referees or players to keep track of scores or points in a game play.

In yet another aspect the ball is provisioned to record and transmit data regarding a multitude of parameters such as but not limited to speed, velocity, spin, acceleration, altitude, distance, direction, drop, impact force, and the like.

In another aspect, there is provided a sports ball, comprising: an outer membrane including at least two portions stitched together; an inner core made of a material including a resilient polymer and a ceramic powder; and a central core overlapping a centroid of the ball, said central core including a metallic material. The resilient polymer may be silicone rubber.

The ratio of silicone rubber to ceramic powder may be in the range 25 to 65 percent silicone rubber to 75 to 35 percent ceramic powder by mass, respectively. The ratio of silicone rubber to ceramic powder may be approximately 60:40 by mass.

The ceramic powder may include zirconium. The ceramic powder preferably includes sodium or a sodium compound. The sodium compound may be sodium silicate borate. The ceramic powder may include calcium.

More than 50 percent by mass of the inner core may include a silica sodium borate. Less than 50 percent by mass of the inner core may be composed of a silicone rubber.

The central core may have an internal volume that is less than 30 percent of the total volume of the ball. The central core may have an internal volume that is less than 15 percent of the total volume of the ball.

The inner core may include a plurality of layers of different materials. The ball may have a weight in the range of 156 to 163 grams.

The central core may include a power source, a movement sensor, and a radio transceiver. The sports ball may be a cricket ball. The sports ball may be a baseball.

In another aspect, there is provided a sports ball, comprising: an outer layer including a plurality of dimples; an inner core made of a material including a silicone rubber and a ceramic powder; and a central core overlapping a centroid of the ball, said central core including a metallic material.

The ratio of silicone rubber to ceramic powder may be in the range 25 to 65 percent silicone rubber to 75 to 35 percent ceramic powder by mass, respectively. The ratio of silicone rubber to ceramic powder may be approximately 60:40 by mass.

The ceramic powder may include zirconium. The ceramic powder may include sodium or a sodium compound. The sodium compound preferably includes a sodium silicate borate.

The ceramic powder may include calcium.

More than 50 percent by mass of the inner core may include, or be composed of, a sodium silicate borate. Less than 50 percent by mass of the inner core may include, will be composed of, a silicone rubber.

The central core preferably has an internal volume that is less than 30 percent of the total volume of the ball. The central core preferably as an internal volume that is less than 15 percent of the total volume of the ball.

The inner core may include a plurality of distinct layers of different materials. The central core may include a power source, a movement sensor, and a radio transceiver.

The ball may be a golf ball. The ball may be a hockey ball.

In another aspect, there is provided a virtual reality system for interactively simulating a game of golf, comprising: a smart golf ball including a power source, at least one sensor, and a radio transceiver; and a headset including a visual display, a microprocessor, and a radio transceiver, said microprocessor being configured to display a simulated environment and receive sensor data from said smart golf ball communicated through the respective radio transceivers of said smart golf ball and said headset.

The microprocessor may be configured to calculate a virtual trajectory and virtual landing area of the ball after a user hits the ball, the calculation being carried out using impact data received from the ball by radio communication from the ball after the ball is impacted. The microprocessor may be configured to track live scores as a game is played.

The radio transceiver is preferably configured for a peer-to-peer communications standard. The radio transceiver is preferably configured for a Bluetooth communications standard.

The headset may be configured to receive the position data of said smart golf ball through a remote processor. The remote processor may be configured to calculate a trajectory and landing area of the ball after a user hits the ball, the calculation being conducted without radio communication from the ball after the ball is hit.

The remote processor is preferably a mobile communications device. The mobile communications device preferably configured to establish a peer-to-peer communications link with the smart ball.

In another aspect, there is provided a method for actuating the changing of modes of a smart ball including sensors, a processor and a transmitter, the method comprising the steps of: receiving signals from sensors indicative of movement of the ball; comparing the received signals subjecting the ball to a predetermined movement pattern, determining whether the received signals match a predetermined movement pattern; and actuating a different mode based on the determination.

The actuation of the different mode may include starting transmission of sensor readings. The actuation of the mode may include stopping transmission of sensor readings. The smart ball may have a clock generator, and the actuation of said different mode may be for a predetermined time period. Continued actuation of said different mode may be dependent on whether the smart ball is subject to a significant impact within the predetermined time period.

The method may include the step of detecting whether the ball has received a significant impact, and transmitting sensor readings for a predetermined time period based on the detection.

The method may include stopping transmission of sensor readings after the detection of a significant impact.

In another aspect, there is provided a smart ball configured for carrying out a method as described.

In another aspect, there is provided a method for activating a smart sports ball, including the steps of: providing the smart sports ball, the smart sports ball including a power source, a directional sensor, and a radio transceiver; and sending, upon manual manipulation of the smart sports ball, an activation signal from the radio transceiver to a mobile communications device having a graphic user interface to activate the graphic user interface.

Preferably, the activation signal sent to the mobile communications device includes a unique identifier associated with the ball. The graphic user interface being activated may be customised for a particular user based on a user profile populated prior to activation.

In another aspect, there is provided a smart ball configured for carrying out the method as described.

In another aspect there is provided a locator system for determining the direction and trajectory of an item put into motion by an impact, the item including at least one or more accelerometers, at least one magnetometer, and a transmitter, the locator system including: a receiver configured for receiving an acceleration signal from the item indicative of the acceleration that the item is or has been subjected to due to the impact; and a directional impact signal from the item indicative of the direction from which the impact was exerted on the item; and a processor configured for predicting the direction and trajectory of the item from the received acceleration signal and the directional impact signal.

The locator system can include a geo-location system for determining the coordinates of a location. The receiver may be configured for receiving a spin signal indicative of the spin of the item, preferably from a gyroscope.

The locator system is configured for receiving environmental data from the Internet and/or from environmental sensors.

The locator system preferably includes a mobile phone including a geo-location system.

The locator system preferably includes a transmitter. The transmitter may be configured to transmit data over the Internet.

In another aspect, there is provided a supporting frame for a smart ball, the supporting frame being configured for at least partially surrounding and securely holding an electronic device within it, the supporting frame including an outer surface that is at least partly spherical. Preferably the supporting frame is adapted for receiving a settable polymer.

In another aspect, there is provided a central core for a smart ball, the inner core including an electronic device and a supporting frame, the supporting frame being configured for surrounding and securely holding an electronic device within it, the supporting frame defining an outer surface that is at least partly spherical.

The frame may be filled with a settable polymer. The settable polymer may be configured to complement the spherical shape of the frame.

The electronic device may include at least one accelerometer, a transmitter, and a power source. The power source may be rechargeable wirelessly. The electronic device may include a gyroscope. The electronic device may include a magnetometer.

The polymer may be silicon rubber silicone.

In another aspect, there is provided a ball including a supporting frame as described.

In another aspect, there is provided a ball including a central core as described.

This invention may also be said broadly to include the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

FIG. 2 shows a top view of a microprocessor unit used in the invention, illustrating position of various components, such as but not limited to computer module, signal transmitting module and the like.

DETAILED DESCRIPTION

The following description, drawings, and terminology are illustrative, and used herein for the purpose of describing particular embodiments only. The embodiments are not intended to be restrictive and are not to be construed as limitation of the invention. Numerous specific details are described to provide a thorough understanding. However, in certain instances, well-known or conventional details are not described in order to avoid obscuring the description.

The present disclosure describes wireless methods and systems integrated with balls used in sports and other entertainment activities. In the following disclosure, there are instances wherein a golf ball 100 and/or cricket ball 500 is considered as an exemplary element and it should be evident that the present disclosure also envisages the use of balls and/or items for use in other sports.

Figure 1:
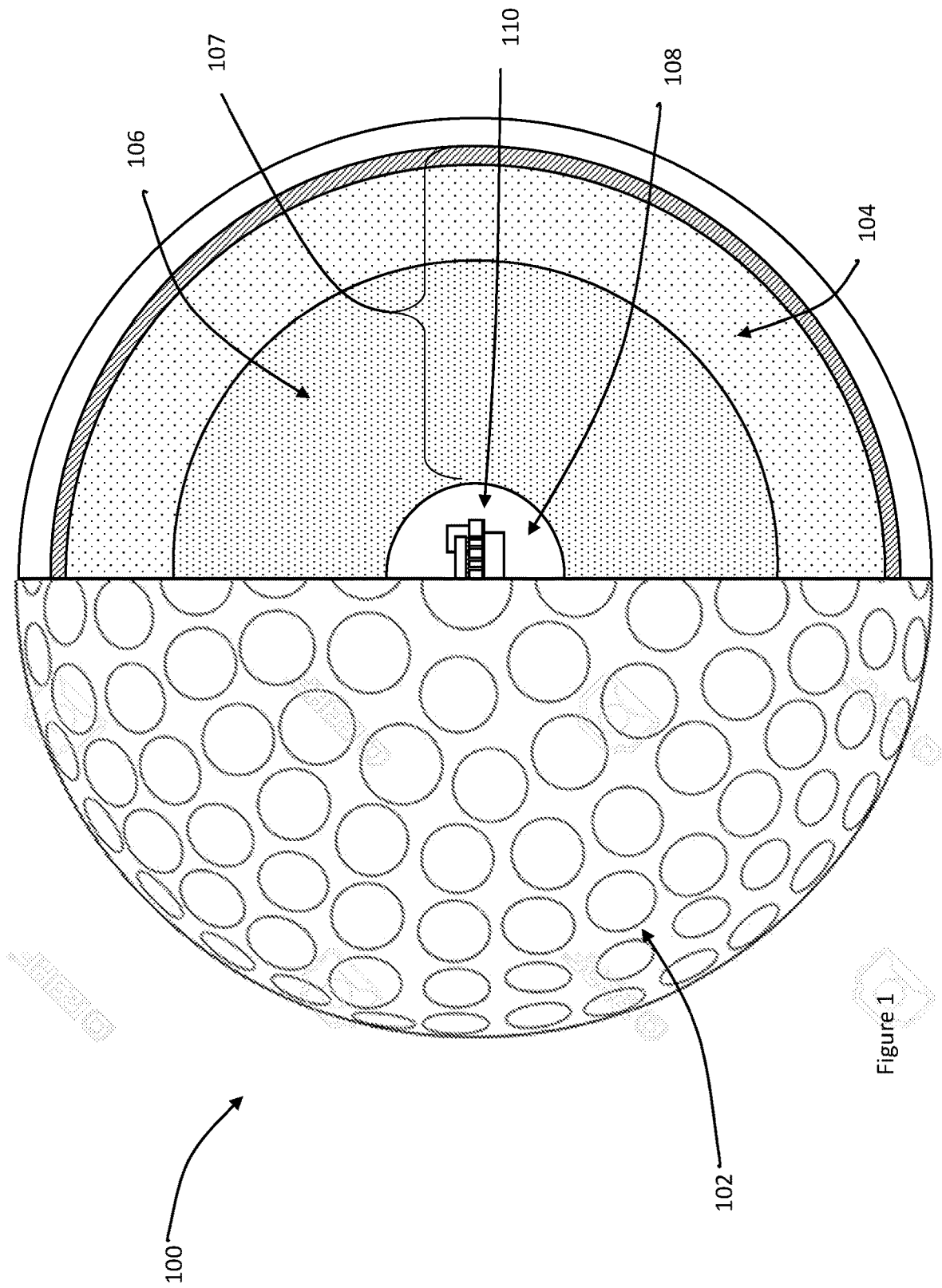
FIG. 1 shows a partial cross-sectional view of a first embodiment of an exemplary ball, displaying the external and internal layers as well as the location of the system and device used in the invention.

Referring to FIG. 1, a cut-away of an exemplary golf ball 100 is shown having different layers of the material of the ball 100. A dimpled hard outer membrane 102 covers the exterior surface of the ball 100. A central core 108 encloses and protects a micro-processing unit 110. The central core 108 overlaps the centroid of the ball, and includes the micro-processing unit 110, which preferably includes a conductive material such as metal. An inner core 107 that can be made of multiple composite layers (shown as layers 104 and 106 in FIG. 1) extends between the outer membrane 102 and the central core 108. The number of interspersed multiple composite layers can be decreased or increased, and the composition of the layers can be varied, depending upon the type of ball in order to maintain the feel and performance of a normal ball during specific game play. This will be discussed in more detail below.

The central core 108 includes a micro-processing unit 110 which will be described in more detail below. The micro-processing unit 110 includes a sensor module, computer module or controller and a signal transmitting module or transmitter.

Figure 2:
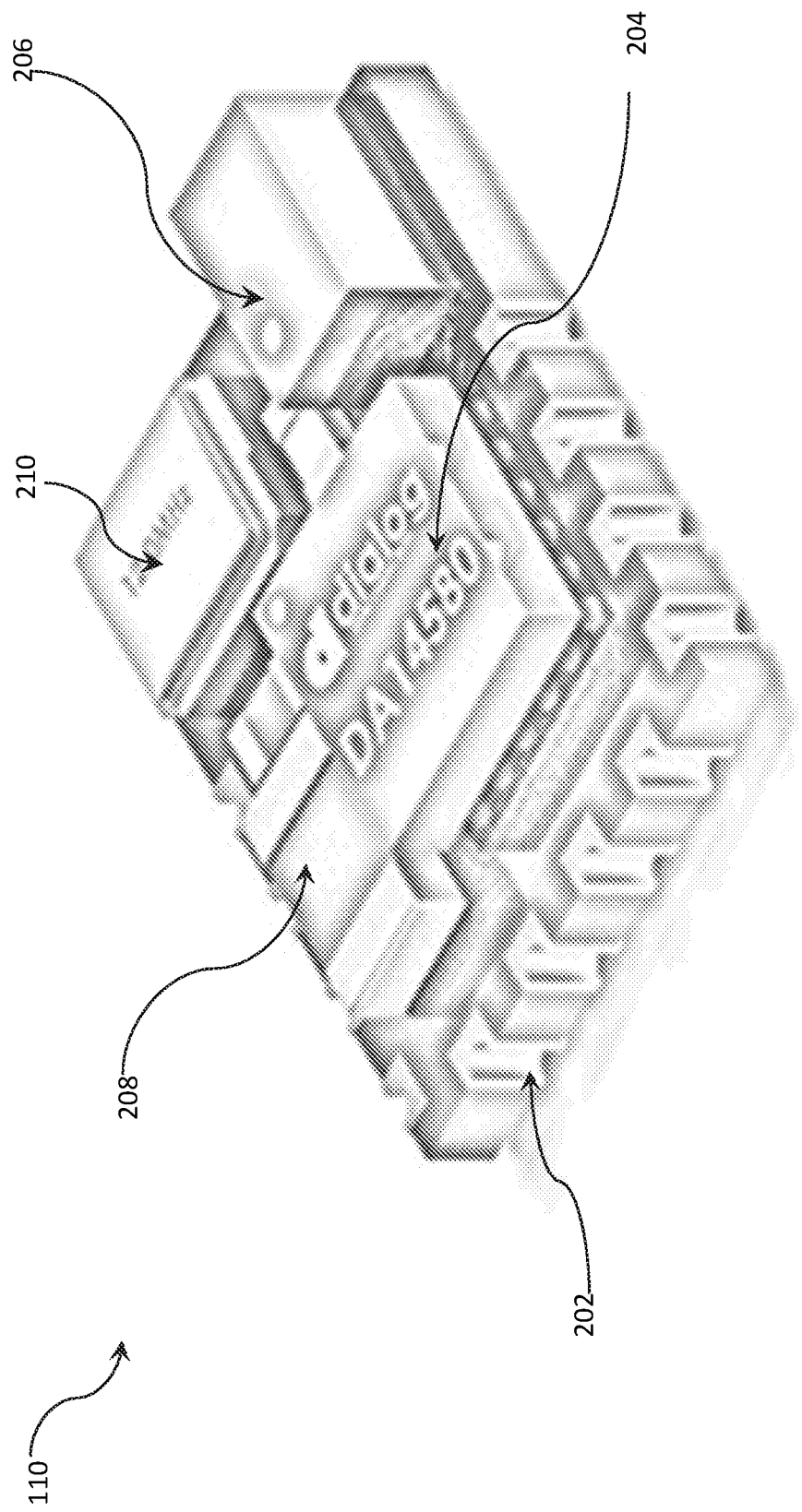

Referring to FIG. 2, a top perspective view of the micro-processing unit 110, including a printed circuit board (PCB) 202, a transmitter in the form of a signal emitting chip 204 and an antenna unit 206, a sensor module or sensor unit 208, and a computer module in the form of a microprocessor 210 is depicted. All these components are mounted onto the PCB 202, which can be customized based on the size and shape requirements of a particular ball or item. The micro-processing unit 110 further includes a clock generator that produces a timing signal to enable the processor to determine whether a period of time has passed or not.

The sensor module 208 preferably includes a plurality of sensors, and in particular three axis accelerometer sensors that can detect acceleration of the ball in at least three dimensions, a magnetometer that can determine compass direction, and a gyroscope for detecting rate and/or direction of spin. In alternative embodiments additional sensors can be provided such as a barometer, a proximity sensor, a Hall effect sensor, an inclinometer, a vibration sensor, an optical sensor, or any other sensor.

Figure 3:
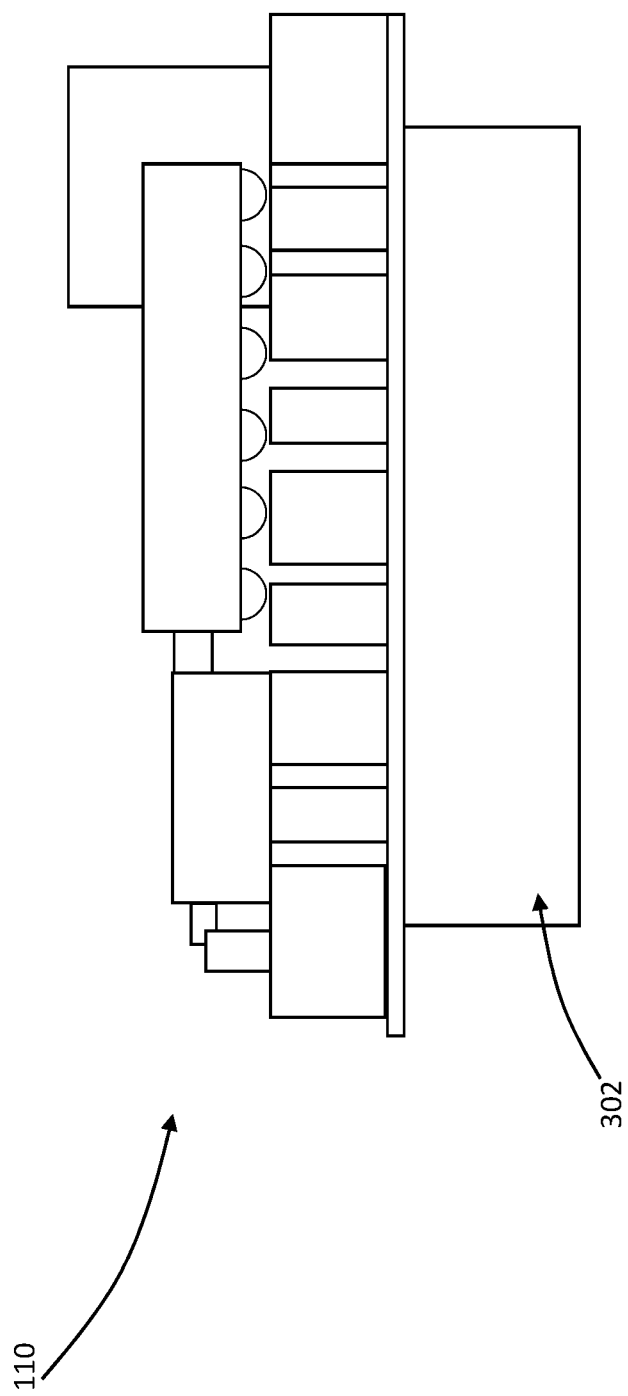
FIG. 3 shows a side view of the microprocessor unit of FIG. 2 used in the invention.

Further, during operation, signals from the sensor unit 208, which houses the different types of sensors mentioned above, are recorded as sensor information. This sensor information is sent to the signal-emitting chip 204 by the computer module or microprocessor 210, for transmission via the antenna unit 206 to a paired device 2000. The micro-processing unit 110 is powered through a power source 302, in the form of a battery, shown in FIG. 3. The batter is preferably a Lithium Ion battery, but could also be any of a Silicone Anode, Graphene Anode, Lithium Air, Aluminium Air, Zinc Oxide, Lithium Sulphur, Nickel Cadmium, Nickel-metal Hydride, Lithium Polymer, Magnesium Ion, Potassium Ion, Zinc Ion, or Alkaline (Zinc manganese oxide) battery.

In a preferred embodiment, the readings from the sensors can together be processed to detect acceleration of the ball as a vector (i.e., having a magnitude and direction) and/or detect the acceleration that the ball is subject to, relative to a common acceleration vector such as gravity. The determination of the magnitude and direction of the acceleration of the ball is discussed in more detail below.

The computer module includes a digital memory storage, preferably in the form of flash memory, and is configured to record data received from the sensors, for transmission at a later time. Such data can relate to a multitude of parameters such as speed, velocity, spin rate, spin direction, acceleration, altitude, distance, direction, compass direction, air pressure, impact force, impact direction, and the like.

The memory can also be used to store software instructions for directing operation of the processor of the computer module in a manner that will be described in more detail below.

The transmitter 204 is then used to transmit the data recorded on the memory. Preferably, the transmitter will also transmit a unique identifier associated with the ball. In another embodiment, it is envisaged that the recording of sensor data is not required, and the sensor data can instead the transmitted by the transmitter 204 as it is generated by the sensors and received by the computer module.

The micro-processing unit 110 can also be additionally configured to store and/or process the recorded data apart from just recording and transmitting through the wireless signal transmitting module 204. However, this is not preferred as it would entail additional power usage by the micro-processing unit 110.

In one of the exemplary embodiments as shown in FIG. 1 the ball used is a golf ball having an exterior dimpled surface, the dimples being recessed into an outer membrane 102 on the outside of the ball. The central core 108 preferably provides cushioning and/or protection to the micro-processing unit. An inner core extends 107 between the central core 108 and the outer membrane 102. Suitable materials to perform such a function may also be chosen keeping in mind the standards, form and performance requirements of a normal golf ball.

Figure 10:
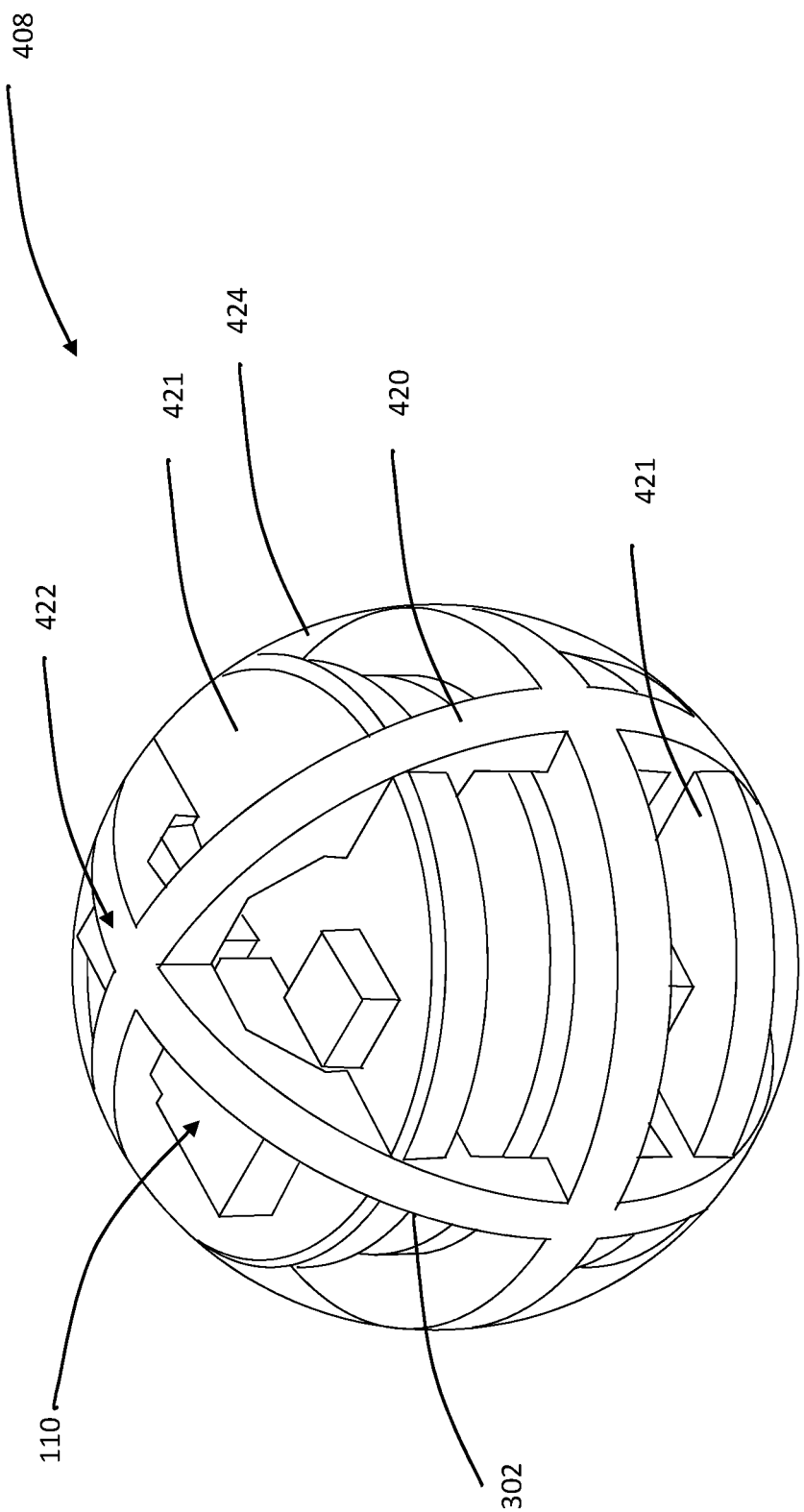
FIG. 10 shows a first embodiment of a central core.

In a preferred embodiment shown in FIG. 10, it is envisaged that the central core 108 can include a supporting frame 420. Preferably, the supporting frame 420 is composed of a plastics material, such as a thermo-plastics type material, and is configured for at least partially surrounding and securely holding the micro-processing unit 110 within it. The supporting frame 420 is preferably integrally formed in a moulding process. In this embodiment, the supporting frame secures a pair of PCB boards 421, and a battery 302 in the middle.

The supporting frame also includes an outer surface 422 that is at least partly spherical and coincides with the outer surface of the central core 108.

Spaces between the supporting frame and the micro-processing unit may preferably be filled with a settable filler 424, preferably in the form of silicone rubber. The settable filler 424 can be a plastics material, a polymer, or a resin. Non-limiting examples of a suitable settable filler include a silicone rubber, a latex material, a rubber material, or the like. The present disclosure contemplates a settable filler 424 comprising a combination of different materials.

The settable filler 424 and the supporting frame 420 together preferably form a spherical outer surface. In this way, the inner core 107 can be layered onto a strengthened central core, especially in multiple layers, while preventing the spherical shape from being compromised.

The settable filler can be composed of a material similar to that of the inner core 107. Suitably, the settable filler serves to support and/or hold the micro-processing unit, and to dampen shocks from impacts on the outer membrane 102 to prevent the impacts being transferred directly to the micro-processing unit 110.

It is envisaged that an exemplary ball for use as a golf ball as shown in FIG. 1 also has a preferred chemical composition. In particular, the inner core 107 of the golf ball 100 shown in FIG. 1 preferably includes a settable polymeric material, such as settable polysiloxanes in the form of silicone rubber, and a ceramic, or similar mineral, material. Preferably the powdered ceramic or mineral is non-conductive. The ceramic powder can be a metal oxide, a silicide, a boride, a carbide or a nitride, or any combination thereof.

Preferably, the silicone material is elastomeric. More preferably, such an elastomeric silicone material is a silicone rubber material. Preferably, the ceramic material is a powder, or is granulated. The ceramic or mineral material can be crystalline or non-crystalline. In certain preferred embodiments, the ceramic material is a ceramic powder. It is envisaged that the ceramic material can be interspersed as particles or granules within a layer of silicone material. The inner core can also include minor amounts of other elements or compositions.

In an alternative embodiment, the ceramic material can be layered between a plurality of layers of silicone rubber material. In an alternative embodiment, the, or each, silicone rubber layer may be composed of one elongate strings of material that is wound tightly in many windings around the preceding layer to form a layer.

Preferably, a ratio of the silicone material to the ceramic material in the inner core is in the range of about 25 percent to about 65 percent of a silicone material to about 75 percent to about 35 percent of a ceramic material by mass, respectively. More preferably, the ratio of silicone material to ceramic material is in the range of about 60 percent of a silicone material to about 40 percent ceramic material by mass, respectively.

The ceramic material can preferably include any one or more of zirconium, a zirconium compound, sodium and/or a sodium compound. Preferably, the sodium compound is sodium silicate borate.

In an alternative embodiment, the ceramic material can include calcium or calcium compound, for example in calcium carbonate, or calcium phosphate. Additionally, it is envisaged that the ceramic powder can include yttrium, borate, wollastonite, magnesium, aluminium, titanium, carbon, platinum or compounds thereof.

In a further alternative embodiment, more than 50 percent of the inner core by mass can be composed of a ceramic powder as described above, while less than 50 percent by mass of the inner core can be composed of silicone rubber or similar resilient polymer. It is further envisaged that alternative polymers to silicone can be used, including rubber, latex, or the like.

Preferably, the central core 108 has an internal volume that is less than about 30 percent of the total volume of the ball, and more preferably less than about 15 percent of the total volume of the ball.

Preferably, the ball 100 has a mass in the range of between about 156 grams to about 163 grams.

The outer membrane 102 is preferably composed of a hard-moulded plastic. Is envisaged that the ball having such a composition could also be used as a hockey ball.

Figure 5:
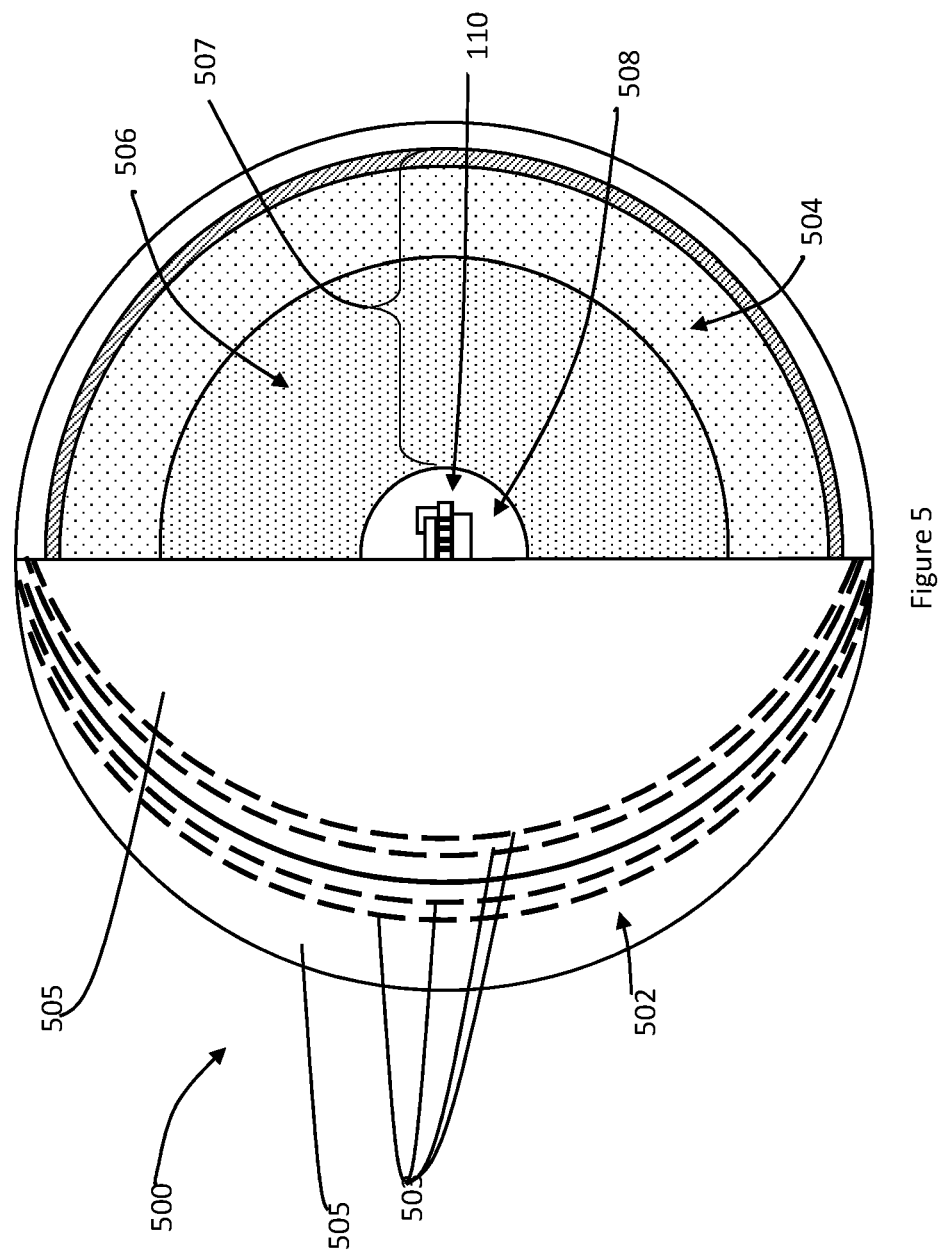
FIG. 5 shows a partial cross-sectional view of a second embodiment of an exemplary ball.

Another ball 500 is shown in FIG. 5, having an alternative configuration. The ball 500 also includes a central core 508 that encloses and protects a micro-processing unit 110. An outer membrane 502 is composed of at least two outer portions 505 composed preferably of leather or a synthetic substitute that are stitched together at seams 503.

The central core 508 is similar to the central core 108 of the ball 100 shown in FIG. 1 in that it overlaps the centroid of the ball, and includes the micro-processing unit 110, which preferably includes a conductive material such as metal. However, the dimensions of the central core 508 may vary from the dimensions of the central core 108 of the ball 100 of FIG. 1.

As shown in FIG. 5, an inner core 507 extends between the outer membrane 502 and the central core 508. The inner core 507 is similarly composed of a polymer such as silicone rubber, and a ceramic powder, and the composition of the inner core 507 may be similar to the composition of the inner core 107 described above. The central core 507 is also envisaged as having an internal volume that is less than about 30 percent of the total volume of the ball, and more preferably less than about 15 percent of the total volume of the ball. Similarly to the inner core 107 described above with reference to FIG. 1, the inner core 507 can include a plurality of layers 504, 506 of different materials, or can be composed of a single polymer layer interspersed with granules of ceramic powder.

Preferably, the ball 100, 500 has a mass in the range of between about 156 grams to 163 grams. A ball as shown in FIG. 5 would be used as a cricket ball. However, a similar ball could be used as a baseball with some modification to the outer membrane 502, for example to change the pattern of the seams 503 and the shape of the portions 505.

It is envisaged that alternative ceramic materials can be used including, but not limited to crystalline and non-crystalline ceramics, and could be crystalline oxide, nitride or a carbide material.

It is further envisaged that the inner core could include fibers (not shown) for increasing the toughness of the polymer layer. Such fibers could include glass fiber, carbon fiber, Kevlar fiber, plastic fiber, basalt fiber or any other suitable fiber. Such fibres may be woven in as a woven fibre layer, or alternatively can be mixed into the silicone rubber as loose fibres.

In one of the embodiments the micro-processing unit 110 is configured to record and analyze data for utilization by users who can further process information to derive insights. However, this embodiment is not preferred, as it is desirable to retain the micro processing unit in as small a form as possible, and to keep power consumption as low as possible. In a preferred embodiment, the micro processing unit 110 transmits the recorded sensor information or data to a paired device 2000 that processes the information as will be described below.

In one embodiment, the micro-processing unit 110 is configurable through digital software that might be executed on a paired device 2000, and transmitted to the ball. In such an embodiment, it is envisaged that the micro-processing unit can include a receiver for receiving such signals.

The ball 100 will be configured to communicate directly with a paired device 2000 (shown in FIGS. 4, 11 and 12), for example a mobile phone or similar device, or alternatively with a paired device in the form of a base station 3010 (shown in FIG. 11), which can perform the required processing of signals received from the ball 100 and communicate them to another device for display. Alternatively, the base station 3010 can communicate the received information to a locator system provided as a web server on the Internet (shown in FIG. 6), which in turn may communicate with a user device 3000 such as a mobile phone over the Internet by a user. Aspects of this will be described in more detail below.

Figure 4:
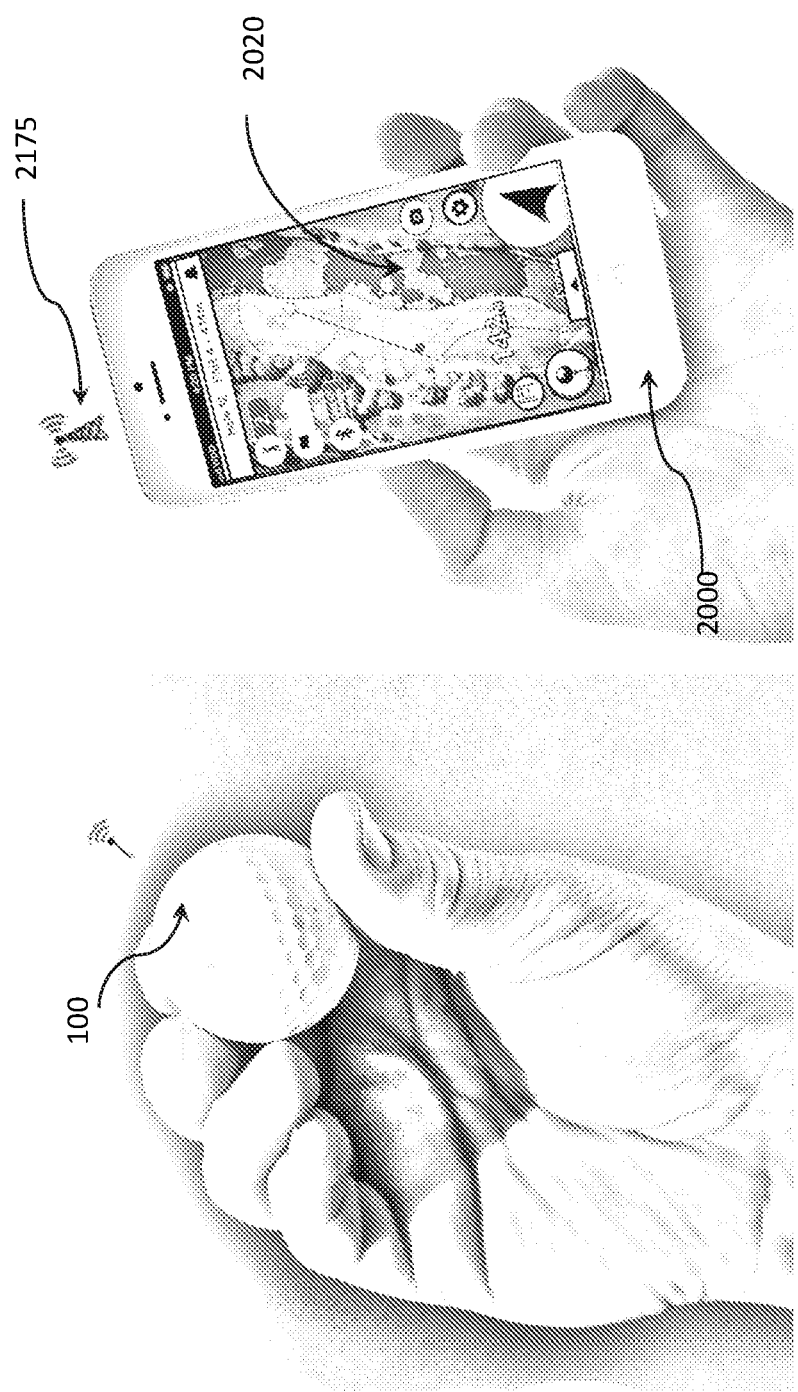
FIG. 4 shows a perspective view of the of a ball paired with a paired device.

Another embodiment is illustrated in FIG. 4, where the exemplary ball 100 of the invention is connected to a paired device 2000 through a transceiver module 2175, that can send commands and receive data from the ball 100.

The wireless communication between the paired device 2000 and the exemplary ball 100 can be wireless network using a variety of protocols including, but not limited to Bluetooth™, Wifi, Zigbee, NFC, LoRa, Wimax, 2G (GSM), 3G, 4G (LTE), 5G, 6G, GPS, Li-Fi, UWB, Satellite, Z-Wave, 6LoWPAN, Sigfox, Weightless, Nwave, Ingenu, HaLow, White-Fi, Infrared, and the like.

In one of the exemplary embodiments of the present disclosure, an electronic circuit contained within micro-processing unit 110 provides a platform for geo-location devices such as global positioning by satellite (e.g., GPS) and/or mobile network cellular-ID (e.g., GSM or CDMA) for communication with and location of the exemplary ball 100.

It is envisaged that the ball can include a passive RFID component, which does not require any power. Different standards and implementations of passive RFID tag are known, and the present disclosure is not limited to any particular type. Alternatively, it can include a powered or active RFID tag, powered (intermittently or continuously) by the power source under control of the processor.

In one of the embodiments the paired device 2000 can, either directly or via a base station 3010, be used to program the exemplary ball 100 to record, process and/or transmit the desired sensor data based on requirement as will be described in more detail below. The requirements and other parameters for recording and/or processing can be configured using a graphical user Interface (GUI) unit or display device 2020 on the paired device 2000, and controlled by a software program.

In one preferred embodiment, the manipulation of the ball 100 can be used to cause the paired device 2000 to initiate the display device or GUI unit 2020 or the software program by specific preconfigured gestures or movement such as shaking the ball, tapping the ball, touching the ball, bouncing the ball, swinging the ball, and the like. This would help conserve the power of the batteries operating the paired device 2000 by allowing the GUI unit 2020 to go into power conservation mode when the ball is not in use.

Figure 13:
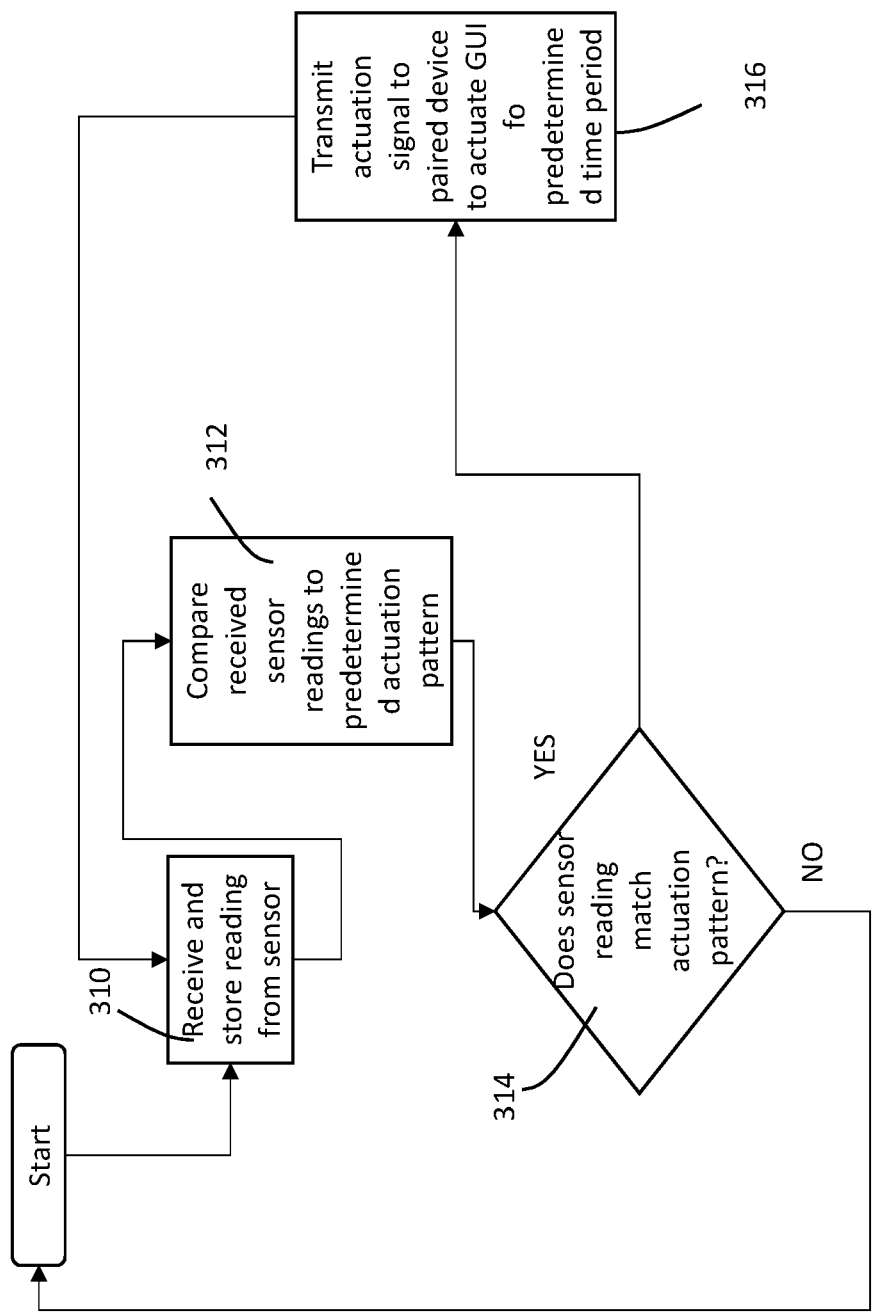
FIG. 13 shows a flowchart of a method of actuation of a graphical user interface on a paired device.

It is envisaged that the GUI 2020 on the paired device can be customised for a particular user based on a user profile for that user. The user profile would be populated prior to manual manipulation of the ball to activate the GUI 2020. Such a process is shown in FIG. 13, whereby the processor on the ball receives 310 and stores signals from the sensors, which are then compared 312 to a predetermined actuation pattern. If the sensor readings match 314 the actuation pattern, then an actuation signal is sent to the paired device 2000 to activate the GUI 2020.

Further the exemplary ball 100 may be configured to initiate transmission through the signal transmitting module only when the accelerometer in the micro-processing unit 110 detects any motion, thus extending the life of the battery 302.

Figure 7:
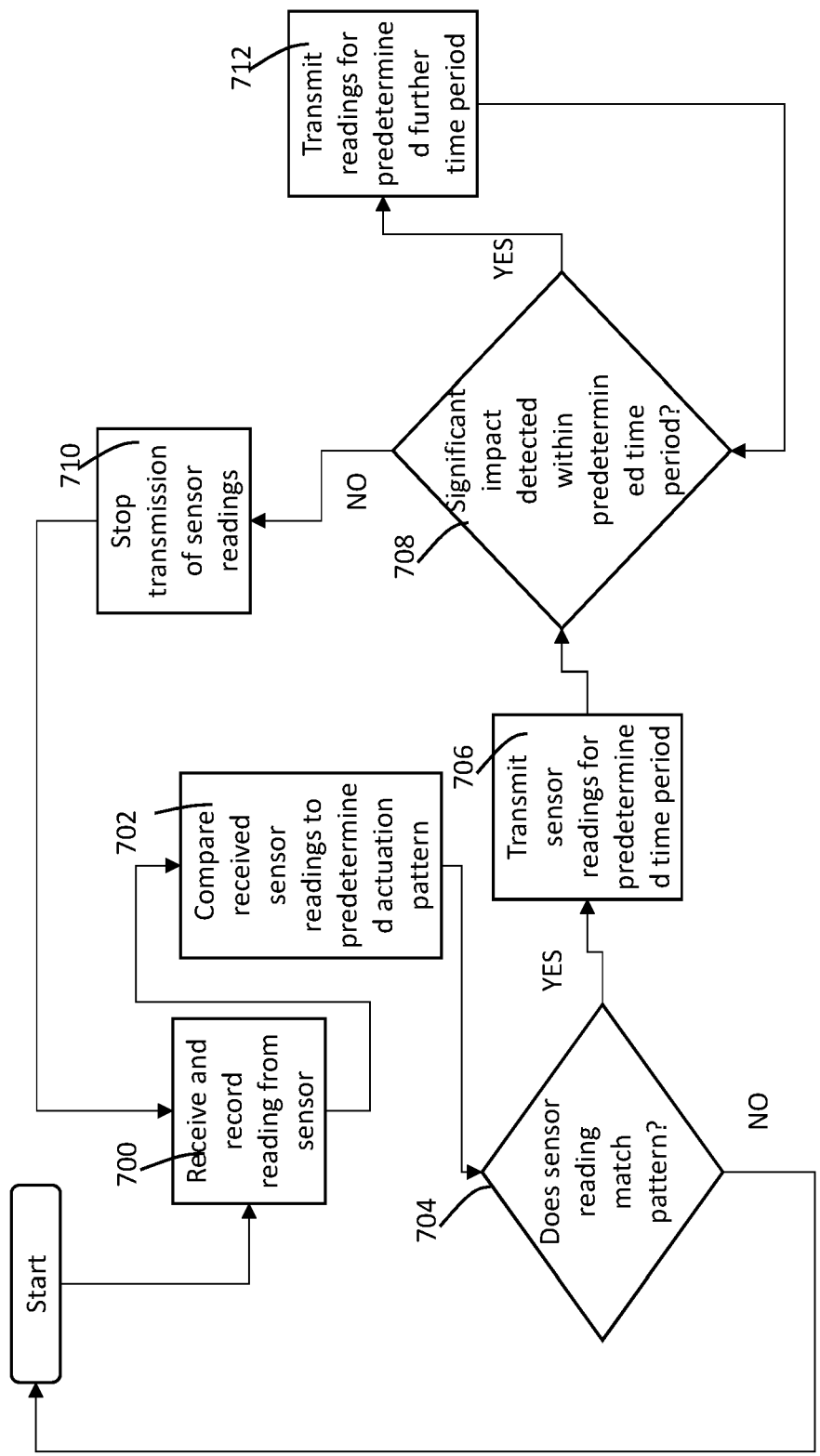
FIG. 7 shows a flow chart of a first method of actuating a mode change in a smart ball.
Figure 8:
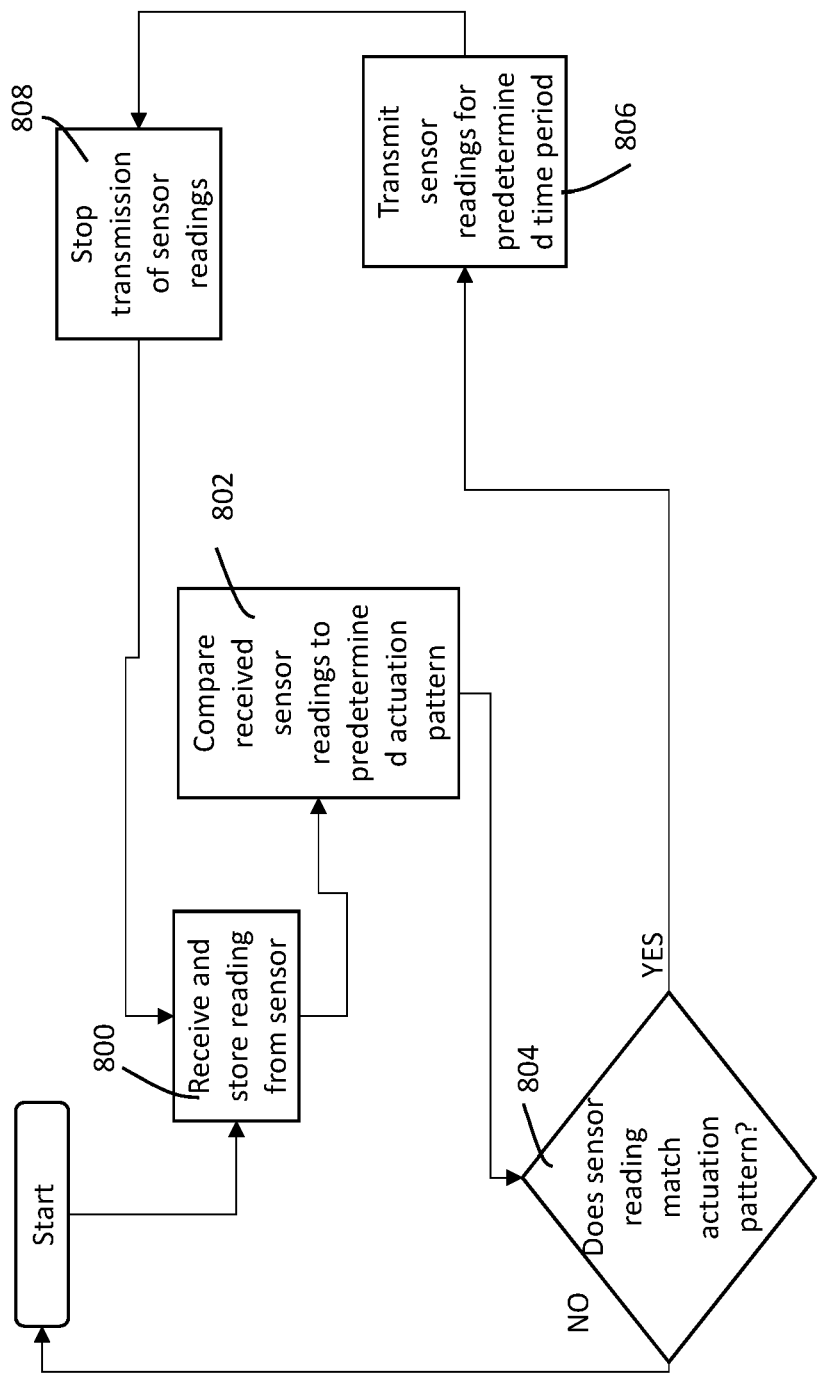
FIG. 8 shows a flow chart of a second method of actuating a mode change in a smart ball.
Figure 9:
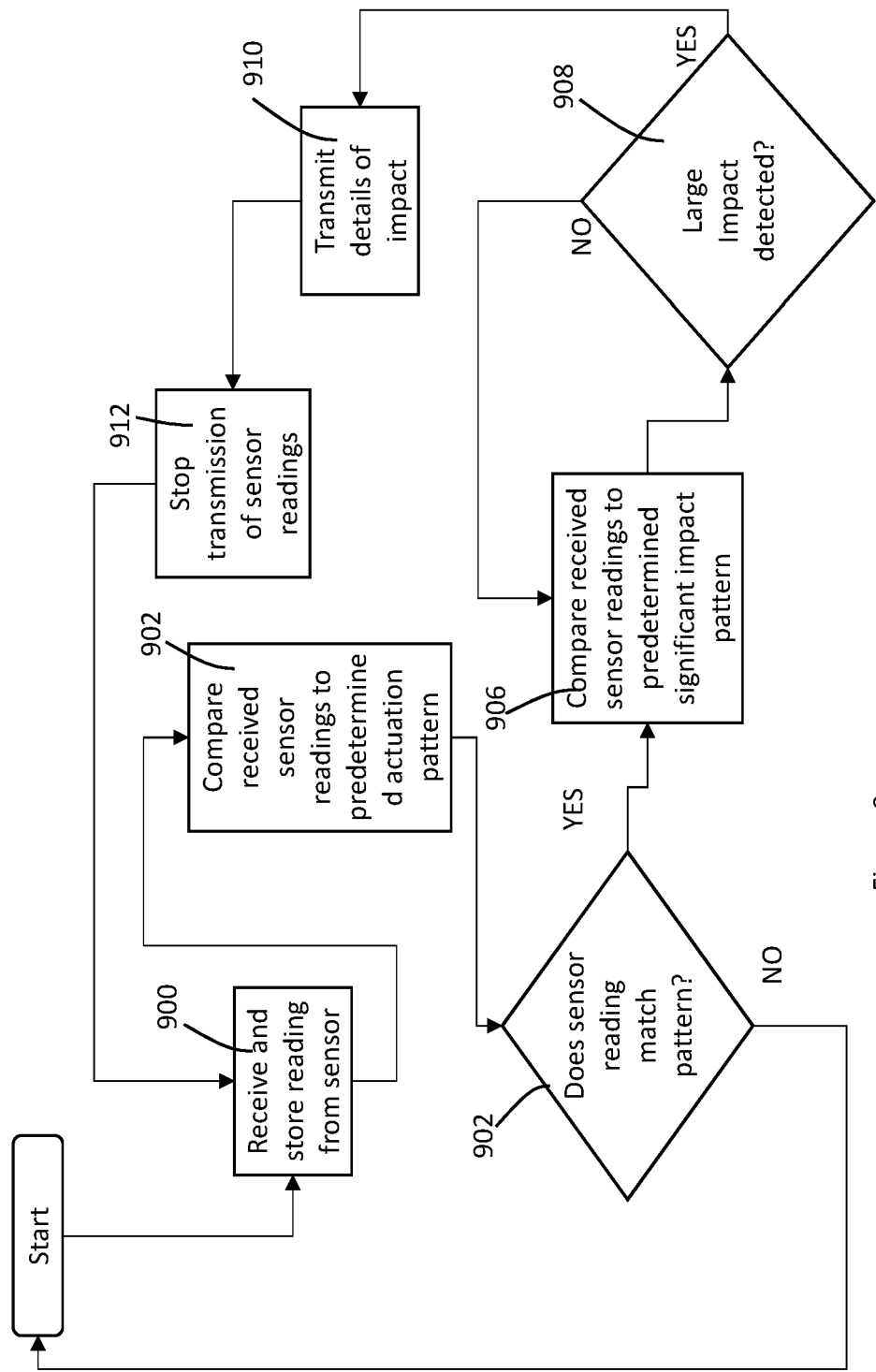
FIG. 9 shows a flowchart of a third method of actuating a mode change in a smart ball.

It is envisaged that the ball 100, 500 will be operable in a variety of modes illustrated in FIGS. 7-9. The ball 100, 500 will preferably be actuatable between at least some of its modes by manual manipulation of the ball, for example by shaking, bouncing, tapping or swinging the ball.

In a sleep mode, the processor 210 will be receiving sensor signals from the sensor module 208, and processing the signals, however the data will not be transmitted to a paired device 2000.

In an active mode, the data received from the sensors will be transmitted to the paired device 2000. Transmission of the data received from the sensors can occur continuously, or at regular intervals, for example every 30 seconds, in order to conserve power. It is envisaged that the time intervals can be reconfigurable from a paired device 2000.

In a preferred embodiment, the ball can be actuated to move from a sleep mode to an active mode by manipulation of the ball 100, for example by shaking the ball, swinging the ball, tapping the ball or bouncing the ball on the ground.

One such procedure is shown in FIG. 7. In such a procedure, the ball will start in a sleep mode, with the processor receiving 700 and recording signals from the sensors. In sleep mode, no sensor readings are transmitted. The sensor readings are compared 702 to a predetermined actuation pattern, for example an actuation pattern that would result from the sensors if the ball were to be shaken, tapped or bounced. The predetermined pattern may be previously configured and stored on the memory of the ball 100, 500.

If the sensor reading sufficiently matches 704 the predetermined pattern, then transmission 706 of the sensor readings is actuated for a predetermined time period. Sensor readings continue to be received, recorded and compared to establish 708 whether the ball has been subject to a large or significant impact during the predetermined time period. If a significant impact is not detected within the predetermined time period, then the transmission of the sensor readings can be stopped 710, and the ball will revert back to a sleep mode. If a significant impact is detected, then transmission of sensor readings is extended 712 for a further predetermined time period. The threshold values or pattern that determines whether or not an impact is a large or significant impact can be predetermined, or can be configured via the paired device.

If a large or significant impact is detected within the predetermined time period, then the ball would continue in an active mode for a further predetermined time period. This can continue indefinitely while further significant impacts are detected. This would be useful to conserve power in a golfing situation, for example, where the ball is shaken just before being teed off, and large impacts (from the club striking the ball) are continuously detected during the course of the game, keeping the ball in an active state. Such significant impacts can also be recorded by the paired device in order to keep track of scores.

In another example shown in FIG. 8, a ball 100 will be actuated to its active mode by the processor receiving and storing 800 readings from the sensors, and comparing 802 the received sensor readings to a predetermined actuation pattern. If the sensor readings match 804 the actuation patterns, then the processor causes the sensor readings to be transmitted 806 for a predetermined time period, after which it will revert to the sleep mode and transmissions will be stopped 808.

In another example shown in FIG. 9, a ball 100 will be actuated to its active mode by the processor receiving and storing 900 readings from the sensors, and comparing 902 the received sensor readings to a predetermined actuation pattern. If the sensor readings match 904 the actuation patterns, then the ball is placed in an active mode. It will compare 906 received sensor readings to predetermined significant impact patterns. If a large impact is detected 908, sensor readings of the large impact will be transmitted 910, and the transmission of sensor readings will stop 912 after a single significant impact.

The signals transmitted by the ball are used to determine at least one of the following functions: recording motion characteristics, spin characteristics, location, distance, gameplay score, performance tracking and the like.

In one particular exemplary embodiment of the invention, there is provided a system and method for using a ball to record and transmit data relating to gameplay.

It is envisaged that a user can shake the exemplary ball 100 to initiate the GUI unit 2020 on the paired device 2020 from a sleep or power conservation mode to an active mode.

When the exemplary ball 100 is brought into an active mode during gameplay the micro-processing unit 110 begins transmitting sensor data, which can be monitored in a real-time manner through the GUI unit 2020 on the paired device 2000;

The exemplary ball 100 can transmit all data logged by the different sensors or only the required data as communicated to the ball by the paired device, the paired device being instructed by preferences set by a user on the GUI unit 2020, and the ball can then the transmit the required data to the paired device 2000 for viewing through the GUI unit 2020.

The paired device 2000 can then interpret the data, recording different scoring parameters and displaying them on a gameplay score card as well as processing other data to obtain vital insights about performance of a player or the gameplay.

In one of embodiment, the exemplary ball 100 can also have a provision for a socket (not shown) to connect with a USB lead for hardwire communication and/or to receive battery-charging options. However, this embodiment is not preferred. In a preferred embodiment, the battery is rechargeable wirelessly, for example by inductive charging, however alternative charging options could be used, including piezoelectric, resonance charging, near field radio frequency charging, ultrasound, and kinetic energy charging.

In another embodiment, the signal transmission from the ball 100 can also be used to locate the position of the ball thereby facilitating the reduction of losses incurred for balls not found during practice and gameplay.

Figure 12:
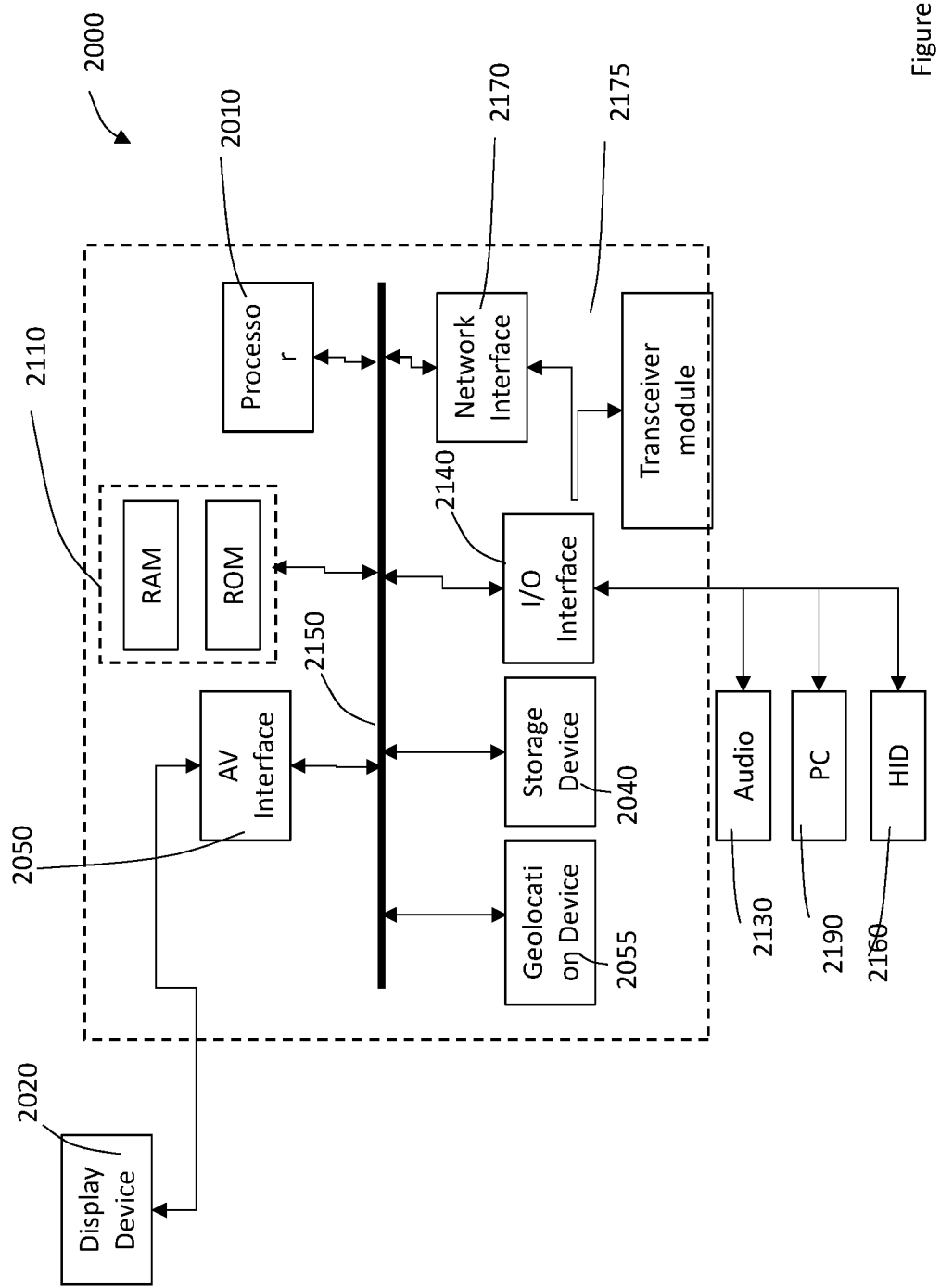
FIG. 12 shows a schematic layout of a paired device for use in a locator system.

A schematic diagram of a paired device 2000 is shown in FIG. 12. The paired device 2000 could be a mobile phone, a standalone purpose-built device, or a web server. The paired device 2000 includes semiconductor memory 2110 that can include volatile memory such as random-access memory (RAM) and/or read only memory (ROM). The steps of the methodologies described herein can be implemented as computer program code instructions executable by the paired device 2000. Computer program code instructions are preferably stored on a storage device 2040.

Paired device 2000 includes a processor 2010 for processing signals received from the ball 100, 500. The paired device 2000 further includes an input/output (I/O) interface 2140 for communicating with one or more peripheral devices, such as an audio device 2130, a remote personal computer 2190, or a human input device (HID) 2160 such as a keyboard, joystick, touch screen, or the like. The paired device 2000 can further include a geolocation device 2055, and an audio-visual (AV) interface 2050 for communicating with a display device 2020. A communication bus subsystem 2150 is provided for interconnecting the various devices described above.

In a further embodiment, it is envisaged that the paired device 2000 or base station 3010 can include an antenna array (not shown) configured for radio direction finding, that is capable of locating a ball 100, 500 from the radio frequencies that it emits. An antenna array could be used to determine the direction from which radio frequency transmissions are being transmitted, using a wide variety of known procedures, including triangulation, Doppler measurement, phase comparison, and/or any other suitable process. In this way, the position and/or direction of the ball can be tracked before or after it is impacted. Such tracking can be used alone, or in combination with the sensor readings, to determine the direction of flight of the ball.

The paired device 2000 incorporates software instructions enabling a locator system for determining the direction and trajectory of a ball 100, 500 that is put into motion by an impact, for example by being hit by a golf club or cricket bat, or from being bounced off the ground. The locator system could, for example, be used by a user during a round of golf to help find their ball after hitting it. The locator system uses the receiver of the paired device for receiving an acceleration signal from the ball, as well as a directional impact signal.

The acceleration signal is indicative of the acceleration that the ball has been subject to, due to the impact. The directional impact signal is indicative of the direction from which the impact was exerted on the ball, and can be determined from accelerometer readings.

The directional impact can be compared to a compass direction determined by the magnetometer in the ball on impact, to establish the direction in which the ball travels on impact. Readings from a three-axis accelerometer will be able to establish the force with which the ball was impacted, as well as the angle of the trajectory of the ball. Further, readings from the magnetometer and/or gyroscope in flight will be able to provide additional details such as the direction and rate of spin on the ball. Known effects of spin on aerodynamics of the ball can be used to determine the effect of spin on the trajectory of the ball.

The locator system uses this information to determine and predict the direction and trajectory of the ball.

Importantly, since the direction and trajectory of the ball can be determined from only the sensor readings on impact of the ball, these readings can be transmitted from the ball to the paired device 2000 immediately after impact, and transmission need not occur on a continuous basis, thereby reducing power consumption by the ball.

The locator system further preferably includes a geolocation device, such as a GPS device, that is capable of determining the geographic position coordinates of the ball before it is impacted.

In order to locate the position of, for example golf balls, it is envisaged that the geolocation device (GPS) on the paired device will be used to determine the geographic coordinates (for example the tee on a golf course) from which a ball will be impacted or hit. This can be accomplished by placing the geolocation device directly above the ball and marking its position on the GPS device. The geographic coordinates will then be used by the locator system in the determination of the initial position of the ball, from which the direction and trajectory of the ball can be used to determine a predicted landing position or zone.

It is envisaged that these details will be transmitted to the paired device within a very short time period after impact of the ball, and preferably during the first second of flight of the ball. Using all of these details, the starting point, direction and trajectory of the ball can be determined, and a probable landing position or zone can be predicted.

It is further envisaged that the paired device can retrieve environmental conditions, either from environmental sensors that are directly connected to the paired device 2000, or via the Internet. Environmental conditions such as wind speed, humidity, temperature, or the like can influence the trajectory of a ball. These can all be taken into account in predicting the landing position of the ball.

When the ball is found, the actual position of the ball can be input by the user using the paired device, by, for example, holding the paired device above the ball when it is found and recording its coordinates. This will provide feedback that will enable the prediction algorithms to more accurately predict the landing position or zone in the future. It is envisaged that machine learning can be used to modify the prediction algorithms. The machine learning is preferably in the form of supervised machine learning, but could also be unsupervised machine learning, or reinforcement learning.

It is further envisaged that a ball 100 500, and locator system such as those described above, can be used in an augmented reality system or virtual reality system to simulate a golf game.

The virtual reality system includes a smart golf ball 100 as described above, as well as a virtual reality headset 3000 as shown in FIG. 12. The virtual reality headset preferably includes a visual display, and a transceiver, however it is envisaged that the virtual reality headset can include any of the components as described for a paired device 2000. Preferably the headset also includes an audio output, such as a speaker or buzzer.

Figure 11:
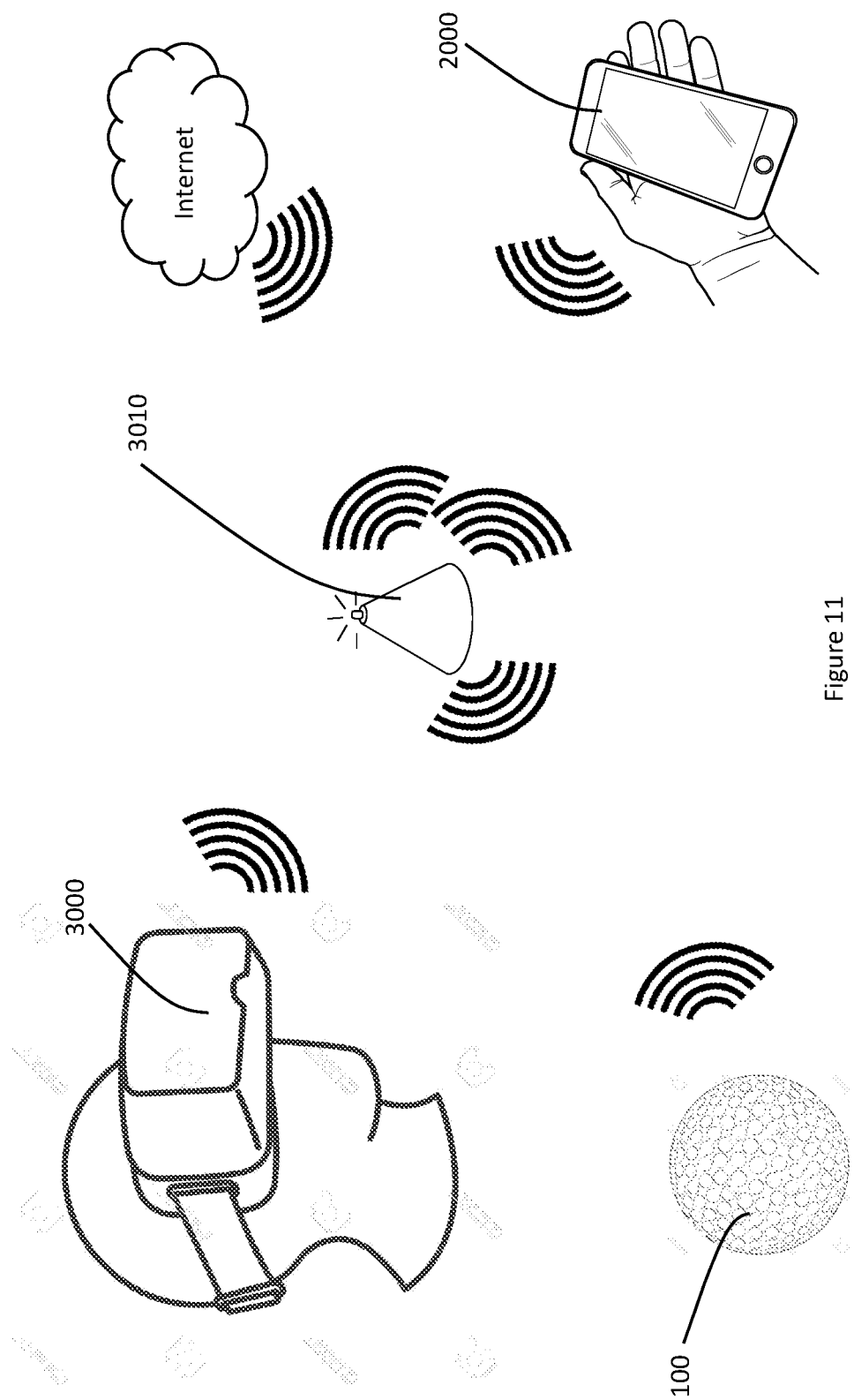
FIG. 11 shows a virtual reality system for playing virtual golf.

As shown in FIG. 11, the headset 3000 can be connected wirelessly to a paired device 2000 by a receiver to receive signals from the paired device 2000 to display. The headset 3000 can further include a transmitter for transmitting signals to the paired device 2000. The headset 3000 can be used to display a simulated environment, such as a golf course, as well as a position of a simulated golf ball on the visual display. A user can hit a real golf ball 100 in a restricted environment, such as within a small netted area, and the sensor readings can be used to determine a predicted trajectory of the virtual golf ball.

The predicted position of the simulated golf ball is determined from sensor data received from the golf ball 100, 500, and processed by the paired device 2000 or base station 3010. Alternatively, the headset can include its own processor for processing data received from the ball 100 and predicting the direction, trajectory and landing position or zone. The predicted position of a simulated golf ball is determined from the sensor readings, and then displayed by the headset in a virtual environment.

The paired device 2000, headset 3000 or base station 3010 can include short range antenna array (not shown) configured for radio direction finding, that is capable of locating the ball 100, 500 accurately in order to display the position of the virtual ball accurately on the tee for the user wearing the headset.

Figure 6:
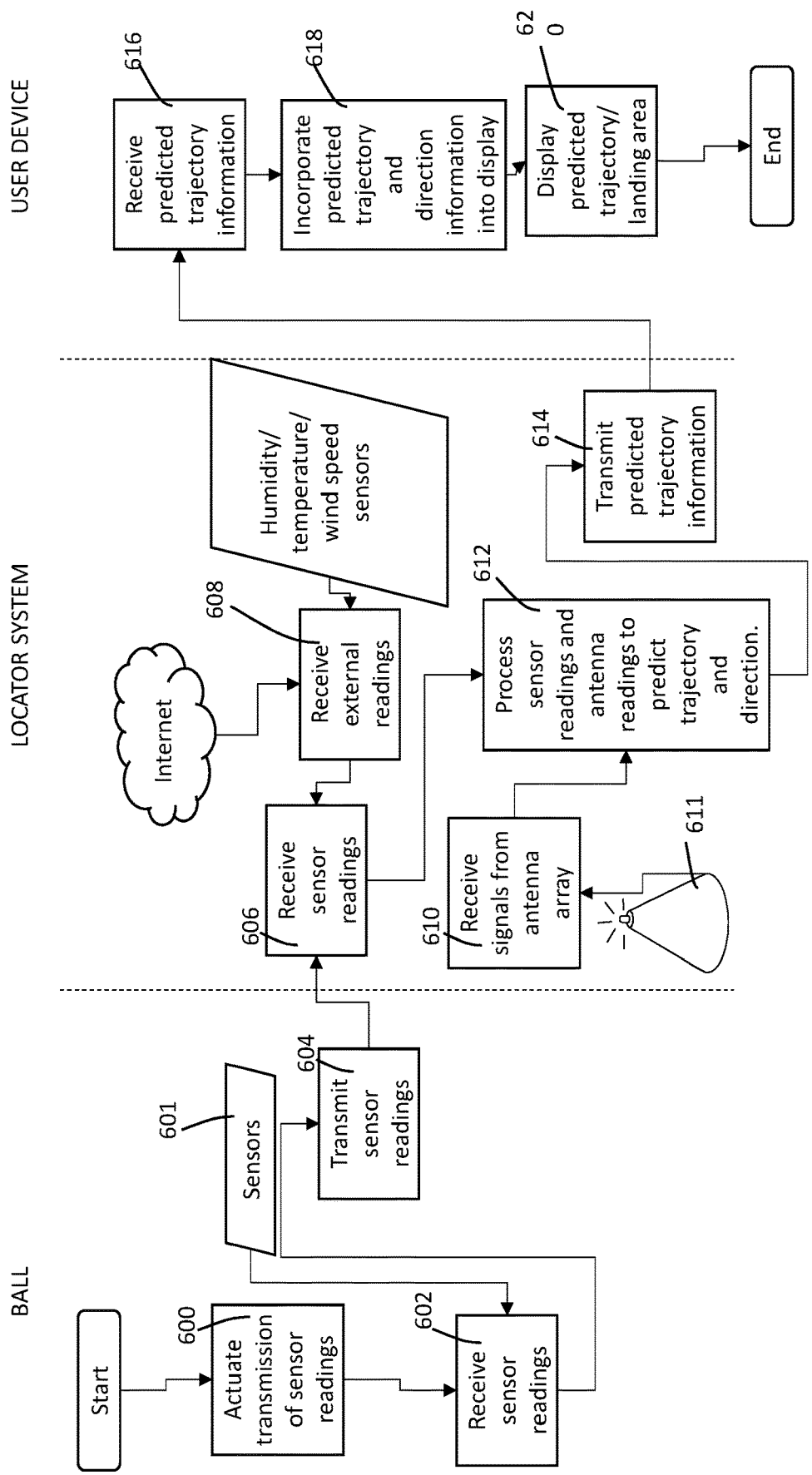
FIG. 6 shows a flow chart of a process used to predict direction and trajectory of a smart ball.

In one embodiment of the method shown in FIG. 6, transmission of the sensor signals is actuated 600 in a manner that is detailed above. The ball receives 602 sensor readings from sensors 601 after impact of the ball, after which the sensor signals are transmitted 604 to a locator system. The locator system receives 606 the sensor signals, and also receives 608 external signals, for example from sources on the Internet, or from environmental sensors. In addition, the locator system can receive 610 positioning signals from an antenna array 611 indicative of the position of the ball. The received signals are then processed 612 to predict the ball trajectory, direction and landing position of the ball after impact.

The predicted trajectory, direction and landing position information is then transmitted 614 to a user device. On receipt 616 of this information, the information is incorporated 618 into a display, such as in a virtual golf course, and is then displayed 620 to a user.

In this way, a virtual game of golf can be played on a virtual golf course, the game being reflective of the user's actual physical golfing ability. The locator system will further be used to track live scores as a game is played.

Preferably the radio transceiver is configured for a peer-to-peer communications standard with either the paired device, or the ball. Such a peer-to-peer communications standard can include Bluetooth, Wi-Fi, or any other suitable protocol.

While there has been shown and described herein what are presently considered to be the preferred embodiments of the present disclosure, it will be apparent to those skilled in the art that various changes and modifications can be made therein without departing from the scope of the present disclosure as defined by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps. Nevertheless, the specification and claims should be read with the understanding that such combinations are entirely within the scope of the invention and the claims.

The appended claims are to be considered as incorporated into the above description.

Throughout the specification, including the claims, where the context permits, the term "comprising" and variants thereof such as "comprise" or "comprises" are to be interpreted as including the stated integer or integers without excluding any other integers.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

When any number or range is described herein, unless clearly stated otherwise, that number or range is approximate. Recitation of ranges of values herein are intended to serve as a shorthand method of referring individually to each separate value falling within the range, unless otherwise indicated herein, and each separate value and each separate subrange defined by such separate values is incorporated into the specification as if it were individually recited herein.

Words indicating direction or orientation, such as "front", "rear", "back", etc, are used for convenience. The inventor(s) envisages that various embodiments can be used in a non-operative configuration, such as when presented for sale. Thus, such words are to be regarded as illustrative in nature, and not as restrictive.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

It will be appreciated that any reference herein to "preferred" or "preferably" is intended as exemplary only.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

In this way, an apparatus and/or method of the present disclosure seeks to overcome or at least partially ameliorate disadvantages present in the prior art, or to at least provide the public with a useful choice.

What is claimed is:

1. A cricket ball, comprising:
   an outer membrane including at least two portions stitched together;
   an inner core being formed of multiple layers of materials including a silicone rubber, a ceramic powder, and a settable material that includes a resin;
   a central core overlapping a centroid of the ball, said central core including a metallic material, said central core including an electronic device having a power source, a movement sensor, and a radio transceiver; and
   a supporting frame configured for at least partially surrounding and securely holding the electronic device within it, said support frame including at least one opening to permit access to at least one component within the support frame, said at least one opening in said supporting frame, and said electronic device each being filled with the settable filler material that includes the resin.

2. The cricket ball of claim 1, wherein the ratio of silicone rubber to ceramic powder is in the range 25 to 65 percent silicone rubber to 75 to 35 percent ceramic powder, respectively.

3. The cricket ball of claim 1, wherein the ratio of silicone rubber to ceramic powder is approximately 60:40.

4. The cricket ball of claim 1, wherein the ceramic powder includes zirconium.

5. The cricket ball of claim 1, wherein the ceramic powder includes sodium or a sodium compound.

6. The cricket ball of claim 1, wherein the ceramic powder includes a sodium silicate borate.

7. The cricket ball of claim 1, wherein the ceramic powder includes one or more selected from calcium, yttrium, borate, wollastonite, magnesium, aluminium, titanium, carbon, platinum or compounds thereof.

8. The cricket ball of claim 1, wherein more than 50 percent by mass of the inner core is composed of a silica sodium borate.

9. The cricket ball of claim 1, wherein less than 50 percent by mass of the inner core is composed of a silicone rubber.

10. The cricket ball of claim 1, wherein said central core has an internal volume that is less than 30 percent of the total volume of the ball.

11. The cricket ball of claim 1, wherein said central core has an internal volume that is less than 15 percent of the total volume of the ball.

12. The cricket ball of claim 1, wherein said inner core includes a plurality of distinct layers of different materials.

13. The cricket ball of claim 1, where the ball has a mass in the range of 156 to 163 grams.

14. The cricket ball of claim 1, wherein the ball is a cricket ball.

15. The cricket ball of claim 1, wherein the ball is a baseball.

16. The cricket ball of claim 1, wherein the ceramic powder includes calcium.

17. The cricket ball of claim 1, wherein the movement sensor is an accelerometer.

18. The cricket ball of claim 17, wherein the power source is rechargeable wirelessly.

19. The cricket ball of claim 1, in combination with a cricket bat for hitting the cricket ball.

* * * * *